United States Patent
Mueller et al.

(10) Patent No.: US 9,925,620 B2
(45) Date of Patent: Mar. 27, 2018

(54) CARBON MONOXIDE LASER MACHINING SYSTEM

(71) Applicant: Coherent, Inc., Santa Clara, CA (US)

(72) Inventors: Eric R. Mueller, West Suffield, CT (US); Michael Alexander Bellos, Lebanon, CT (US)

(73) Assignee: Coherent, Inc., Santa Clara, CA (US)

( * ) Notice: Subject to any disclaimer, the term of this patent is extended or adjusted under 35 U.S.C. 154(b) by 186 days.

(21) Appl. No.: 14/830,050

(22) Filed: Aug. 19, 2015

(65) Prior Publication Data

US 2017/0050266 A1 Feb. 23, 2017

(51) Int. Cl.
| | |
|---|---|
| *B23K 26/06* | (2014.01) |
| *B23K 26/03* | (2006.01) |
| *H01S 3/223* | (2006.01) |
| *H01S 3/00* | (2006.01) |
| *B23K 26/08* | (2014.01) |
| *H01S 3/08* | (2006.01) |
| *B23K 26/062* | (2014.01) |

(52) U.S. Cl.
CPC ........ B23K 26/0643 (2013.01); B23K 26/032 (2013.01); B23K 26/0648 (2013.01); H01S 3/005 (2013.01); H01S 3/0085 (2013.01); H01S 3/2232 (2013.01); B23K 26/06 (2013.01); B23K 26/062 (2015.10); B23K 26/0665 (2013.01); B23K 26/08 (2013.01); H01S 3/0064 (2013.01); H01S 3/0071 (2013.01); H01S 3/08086 (2013.01)

(58) Field of Classification Search
CPC ................................ B23K 26/06; B23K 26/03
USPC ............. 219/121.61, 121.67–121.72, 121.73
See application file for complete search history.

(56) References Cited

U.S. PATENT DOCUMENTS

| | | | |
|---|---|---|---|
| 4,380,694 A | 4/1983 | Dyson | |
| 5,051,558 A | 9/1991 | Sukhman | |
| 6,052,216 A | 4/2000 | Rolfe et al. | |
| 6,697,408 B2 | 2/2004 | Kennedy et al. | |
| 6,784,399 B2 | 8/2004 | Dunsky et al. | |
| 6,826,204 B2 | 11/2004 | Kennedy et al. | |
| 7,113,529 B2 | 9/2006 | Seguin et al. | |
| 7,508,850 B2 | 3/2009 | Newman et al. | |
| 7,675,673 B2 | 3/2010 | Mueller | |
| 7,903,699 B2 | 3/2011 | Seguin et al. | |
| 9,012,851 B2* | 4/2015 | Scherer | 250/353 |
| 9,414,498 B2* | 8/2016 | Hua | H05K 3/0026 |

(Continued)

OTHER PUBLICATIONS

International Search Report and Written Opinion received for PCT Application No. PCT/US2016/043627, dated Oct. 20, 2016, 16 pages.

*Primary Examiner* — Samuel M Heinrich
(74) *Attorney, Agent, or Firm* — Morrison & Foerster LLP

(57) ABSTRACT

Laser-machining apparatus includes a carbon monoxide (CO) laser emitting a beam of laser-radiation having forty-four different wavelength components and optical elements for delivering the radiation to workpiece. An acousto-optic modulator is provided for modulating the beam on the workpiece. A birefringent plate is provided in the beam transported to the workpiece for randomly polarizing radiation incident on the workpiece. A minimum distance of the workpiece from the laser, and the number of different-wavelength components in the laser beam provides that no optical isolator is required for preventing feedback of radiation into the laser.

2 Claims, 3 Drawing Sheets

(56) References Cited

U.S. PATENT DOCUMENTS

| | | | |
|---|---|---|---|
| 2012/0138586 A1* | 6/2012 | Webster | A61B 18/20 219/121.64 |
| 2014/0352358 A1 | 12/2014 | Washko, Jr. et al. | |
| 2015/0083698 A1 | 3/2015 | Hua et al. | |

* cited by examiner

CARBON MONOXIDE LASER MACHINING SYSTEM

TECHNICAL FIELD OF THE INVENTION

The present invention relates in general to laser-machining operations. The invention relates in particular to gas-discharge infrared (IR) laser machining systems.

DISCUSSION OF BACKGROUND ART

IR-laser machining systems are widely used in industrial laser machining operations, such as cutting sheet-metal. The term IR-laser here refers to lasers delivering radiation having a wavelength of about 3 micrometers (μm) or greater.

A particularly preferred IR-laser for such cutting operations is a carbon-dioxide ($CO_2$) laser delivering laser-radiation having a wavelength of about 10 μm. Such lasers are commercially available with output-power up to one kilowatt (kW) or greater.

One problem that can be encountered in $CO_2$ laser sheet-metal cutting operations is instability of the laser output caused by feedback into the laser of laser-radiation reflected from an object being cut. This is particularly problematical in sheet-metal cutting, as most metals have a reflectivity greater than about 80% at wavelengths around 10 μm, even from surfaces that are not highly polished.

A usual solution for this problem is to provide an optical isolator in a beam-path between the laser and a workpiece being cut. An optical isolator is a polarization-sensitive device arranged to transmit radiation along a beam-path toward the workpiece being cut and reflect radiation returning along the beam-path.

Optical isolators for shorter-wavelength radiation, for example radiation having a wavelength of about 1 μm, are relatively simple devices, typically employing a magneto-optic birefringent crystal cooperative with a polarizer and an polarization-analyzer. An alternative arrangement is required for wavelengths greater than about 3 μm, as there are no practical magneto-optical materials (Faraday rotators) that will efficiently transmit these wavelengths.

Optical isolators for these long wavelengths are made from a series of multilayer thin-film reflectors which are polarization-dependent for reflected amplitude or reflective phase. These reflectors are all used with radiation incident thereon at non-normal incidence. Those with polarization-dependent reflective phase provide the function of the Faraday rotators in shorter wavelength isolators.

The reflectors must be coated with very precise tolerances, as there is effectively no means for adjusting the reflected phases at a fixed angle of incidence. Such an isolator can add significantly to the cost of an IR laser-machining system. This is because of the number of components required, the cost of meeting required reflectivity and phase tolerances for the components, and the precision required for aligning the components. There is a need for reducing the cost of optical isolation in IR laser-machining systems.

SUMMARY OF THE INVENTION

In one aspect, optical apparatus in accordance with the present invention for laser-machining a workpiece comprises a carbon monoxide laser delivering a beam of laser-radiation having a plurality of wavelength-components at discrete different wavelengths. A plurality of optical elements is arranged to direct the laser-radiation beam from the laser to the workpiece along a beam-path having a path-length. The number of wavelength-components and the path-length of the beam-path are selected such that an optical isolator is not required to prevent any laser-radiation reflected from the workpiece back along the beam path from being fed-back into the laser.

In another aspect, optical apparatus in accordance with the present invention for laser-machining a workpiece comprises a carbon monoxide laser delivering a beam of laser-radiation having a plurality of wavelength-components at discrete different wavelengths. A plurality of optical elements is arranged to direct the laser-radiation beam from the laser toward the workpiece along a beam-path. An acousto-optic modulator is arranged to selectively transmit the laser-radiation beam along the beam-path to reach the workpiece, or to diffract the laser beam out of the beam-path to effectively prevent the laser-beam from reaching the workpiece.

In yet another aspect, optical apparatus in accordance with the present invention for laser-machining a workpiece comprises a carbon monoxide laser delivering a beam of laser-radiation having a plurality of wavelength-components at discrete different wavelengths. A plurality of optical elements is arranged to direct the laser-radiation beam from the laser toward the workpiece along a beam-path. A birefringent element is located in the beam path. The birefringent element has a thickness selected such that most of the wavelength components are elliptically polarized on reaching the workpiece with elliptical axes at an angle to each other, and any that are not elliptically polarized are circularly polarized with no more than one wavelength component being linearly polarized.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1:
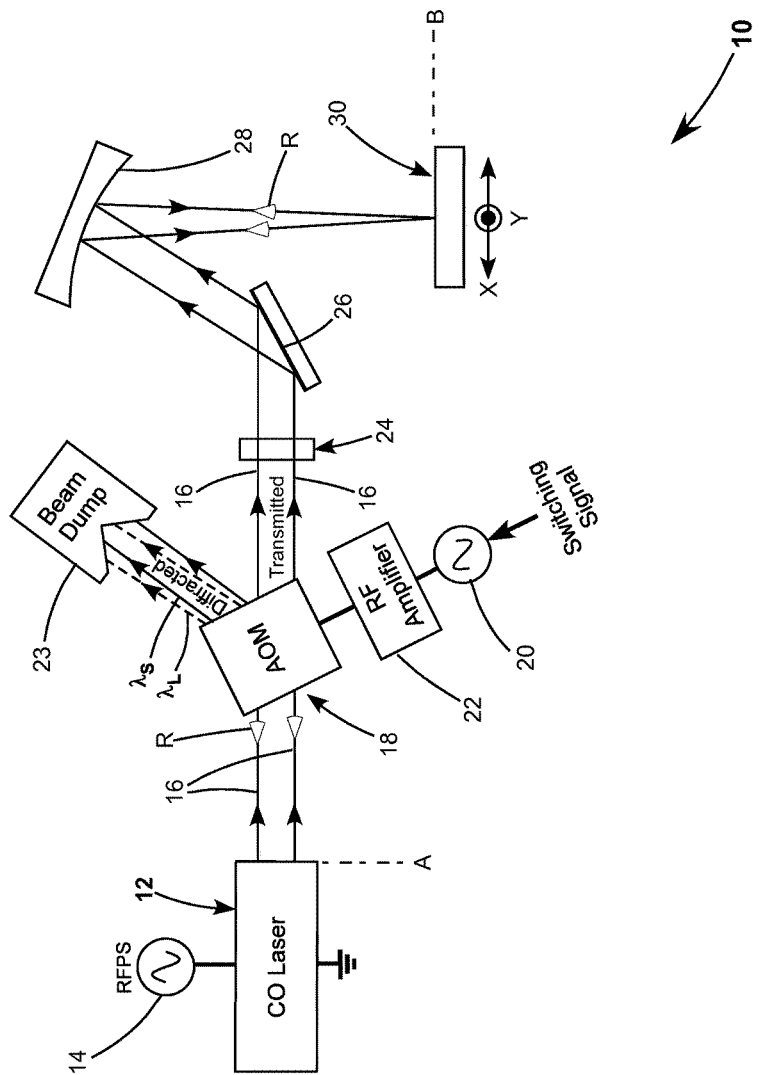
FIG. 1 schematically illustrates a preferred embodiment of laser apparatus in accordance with the present invention for laser machining a workpiece, including a carbon monoxide (CO) laser delivering a beam of radiation having a plurality of plane-polarized wavelength-components, optical elements arranged to transport the beam to and focus the beam on the workpiece, an acousto-optic modulator for selectively allowing the beam to reach the workpiece or effectively preventing the beam of laser-radiation from reaching the workpiece, and a birefringent plate configured and arranged to pseudo-randomly elliptically polarize wavelength components of radiation reaching the workpiece.

Turning now to the drawings, FIG. 1 schematically illustrates a preferred embodiment 10 of laser machining apparatus in accordance with the present invention. Apparatus 10 includes a carbon monoxide (CO) laser 12. Laser 12 is energized by a radio-frequency power-supply (RFPS) 14.

The laser is arranged to deliver a collimated, plane-polarized beam of laser-radiation bounded by rays 16. Beam 16 may be a pulsed-beam or a continuous-wave (CW) beam.

Beam 16 is incident on an acousto-optic modulator (AOM) 16. AOM 18 is activated by radio-frequency (RF) power from an RFPS 20, amplified by a RF amplifier 22. Activation is controlled by switching RFPS 20 on or off using a user-supplied switching-signal.

When AOM 18 is not activated (RFPS 20 is switched off), beam 16 is transmitted directly through the AOM along a zero diffraction-order of the AOM. When AOM 16 is activated (RFPS 20 is switched on), beam 16 is diffracted by the AOM, typically in a first diffraction-order, at an angle to the zero-diffraction order.

The CO-laser radiation beam is not monochromatic and includes a plurality of different-wavelength components discussed in detail further hereinbelow. Because of this, the diffracted beam is no longer collimated, being dispersed by the diffraction, in one plane, into a fan of rays bounded by shortest and longest wavelength components $\lambda_S$ and $\lambda_L$, respectively. The diffracted beam is captured by a beam-dump 23.

The beam transmitted through AOM is transmitted through a relatively thick plate 24 of a birefringent material, such as magnesium fluoride ($MgF_2$). A purpose of plate 24 is to de-polarize beam 16. Several laser machining operations are polarization-sensitive. Plate 24 may be omitted for operations that are not polarization-sensitive. A detailed description of plate 24 is presented further hereinbelow.

Following transmission through plate 24, beam 16 is directed by a plane-mirror 26 to a concave mirror 28 which focuses the beam onto a workpiece 30. Workpiece 30 can be mounted on a translation stage (not shown) which allows the workpiece to be translated with respect to the focused beam in perpendicularly opposed directions X and Y, as indicated in the drawing. The beam can be described as following a beam-path from the laser (at plane A) to the workpiece (at plane B). This beam path preferably has an optical length of about 250 millimeters or greater, for reasons discussed further hereinbelow. It is to be expected that some radiation will be reflected back along the beam-path to the laser as indicated by arrows R.

A purpose of AOM is to selectively prevent radiation in beam 16 from reaching workpiece 30 or to selectively allow radiation in beam 16 to reach workpiece 30. In a pulsed beam 16, this may be required for shaping radiation pulses by "clipping" the leading or trailing edges of pulses, as is known in the art. In a CW or pulsed beam this may be required for preventing working radiation from reaching the workpiece.

In prior-art AOM-controlled arrangements using multi-wavelength beams, the diffracted beam is transmitted to a workpiece. An advantage of this is that when there is no diffraction, no radiation from the laser reaches the workpiece. A particular disadvantage is that the beam is dispersed in the diffraction plane and anamorphically distorted. Optical means including one or more prisms or AOMs must be provided to re-collimate and reshape the beam before it is focused onto the workpiece.

In the inventive arrangement of apparatus 10, radiation cannot be completely prevented from reaching the workpiece as the diffraction efficiency of an AOM is less than 100%. A remaining percentage is transmitted in the zero-order or diffracted into higher diffraction-orders. It has been found, however, that the small percentage transmitted in the zero-order can be kept at a power sufficiently low at the workpiece that no modification of the workpiece results. For purposes of this description and the appended claims, this can be described as the beam being effectively or substantially prevented from reaching the workpiece. A particular advantage of using the zero-order transmitted beam as the working beam, is that a relatively simple optical arrangement, using reflective optics, can be used for transporting the beam to, and focusing the beam on the workpiece.

Another aspect of the present invention is that, under certain conditions of operating apparatus 10, it is not necessary to provide an optical isolator for preventing feedback of radiation into CO-laser 12. A description of required conditions is set forth below with continuing reference to FIG. 1, and reference in addition to FIG. 2.

Figure 2:
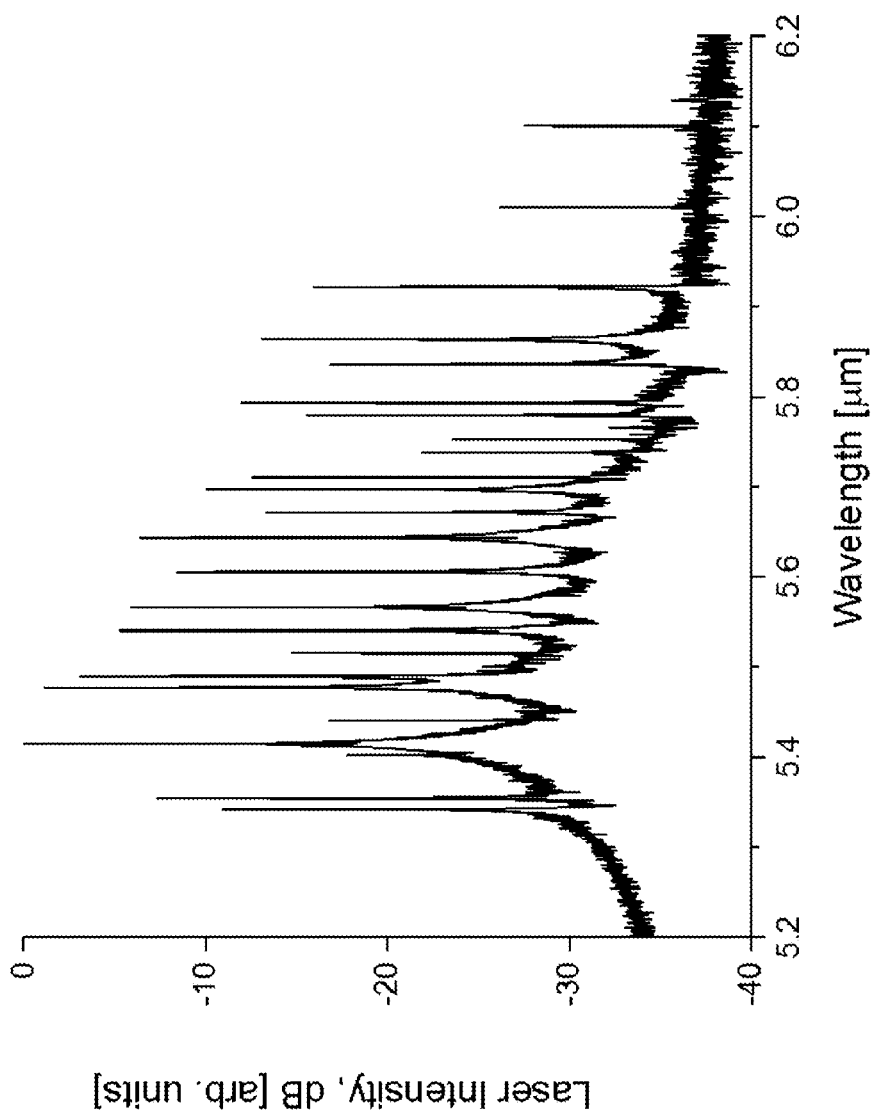
FIG. 2 is a histogram of schematically illustrating a measured output spectrum of a CO laser suitable for use as the CO laser of FIG. 1.

FIG. 2 is a histogram schematically illustrating a measured output spectrum of an experimental laser similar to the model J-3 carbon monoxide laser available from Coherent, Inc. of Santa Clara, Calif. The laser is operated in a pulsed-mode at a pulse-repetition frequency (PRF) of 2 kilohertz (kHz) with a duty cycle of 60% with an average output power of about 250 Watts (W). It can be seen that the output consists of at least about twenty (20) individual oscillating wavelengths in a wavelength-range between about 5.3 μm and 6.1 μm. The relative strengths of the oscillating wavelengths can be estimated from the vertical-axis. This range of wavelengths is created by using laser-resonator mirrors in laser 12 that have sufficient bandwidth to cause all of the wavelengths to oscillate.

In an experiment to determine feedback sensitivity of the laser, laser output was reflected directly back into the laser with a mirror, highly reflective at all of the wavelengths, at various distances from the laser. It was found that provided the mirror was located at a distance from the laser equal or greater than two-hundred-fifty (250) millimeters the laser output remained stable, i.e., insensitive to the feedback. This determines the preferred minimum length for the beam-path of apparatus 10 discussed above. This amount of feedback is well in excess of what would be encountered in apparatus such as apparatus 10. It is believed, without being limited to a particular hypothesis, that the feedback-insensitivity results from the following.

The beam delivered from the laser (beam 16 of apparatus 10) can be considered as having greater than twenty discrete component-beams propagating collinearly, with each component-beam having a wavelength different from that of any other component beam. The component beams leave the laser (more precisely the last reflective component of the resonator of the laser) in phase with each other. The component-beams become increasingly out of phase with each other with increasing propagation distance, such that after a round trip distance greater than about 500 mm, the out-of-phase condition is sufficient that a returned combined beam cannot cause interference and instability in the laser.

In another perspective, the probability of feedback and consequent instability is inversely related to the number of oscillating wavelengths. It is believed that there must be at least fifteen (15) and preferably at least twenty (20) oscillating wavelengths to prevent feedback instability.

Continuing with reference to FIG. 1, plate 24 of apparatus 10 is provided for de-polarizing beam 16. In a system using a monochromatic laser, it is usual to provide a quarter-wave plate which converts plane-polarized radiation to circularly polarized radiation. The circularly polarized radiation is effectively the same as unpolarized (randomly polarized) radiation from a workpiece perspective. In the case of a beam with more than twenty wavelength components, spread over a wide range and not sub-multiple or integer related, it is not possible to provide a wave-plate that will circularly polarize all wavelength-components.

It was determined that the number of different wavelength components could be exploited to advantage to design a wave-plate sufficiently thick that the wave-plate would elliptically polarize most of the wavelength components with polarization axes randomly oriented to each other simulating in aggregate an unpolarized beam. Any components not elliptically polarized, would likely be circularly polarized with no definable polarization axis. Radiation is circularly polarized when the phase-difference (phase-retardation) between ordinary ("o") and extraordinary ("e") rays is an odd multiple of $\lambda/4$, as is known in the art. A plate-thickness can be selected such that all wavelength components are elliptically polarized.

Figure 3:
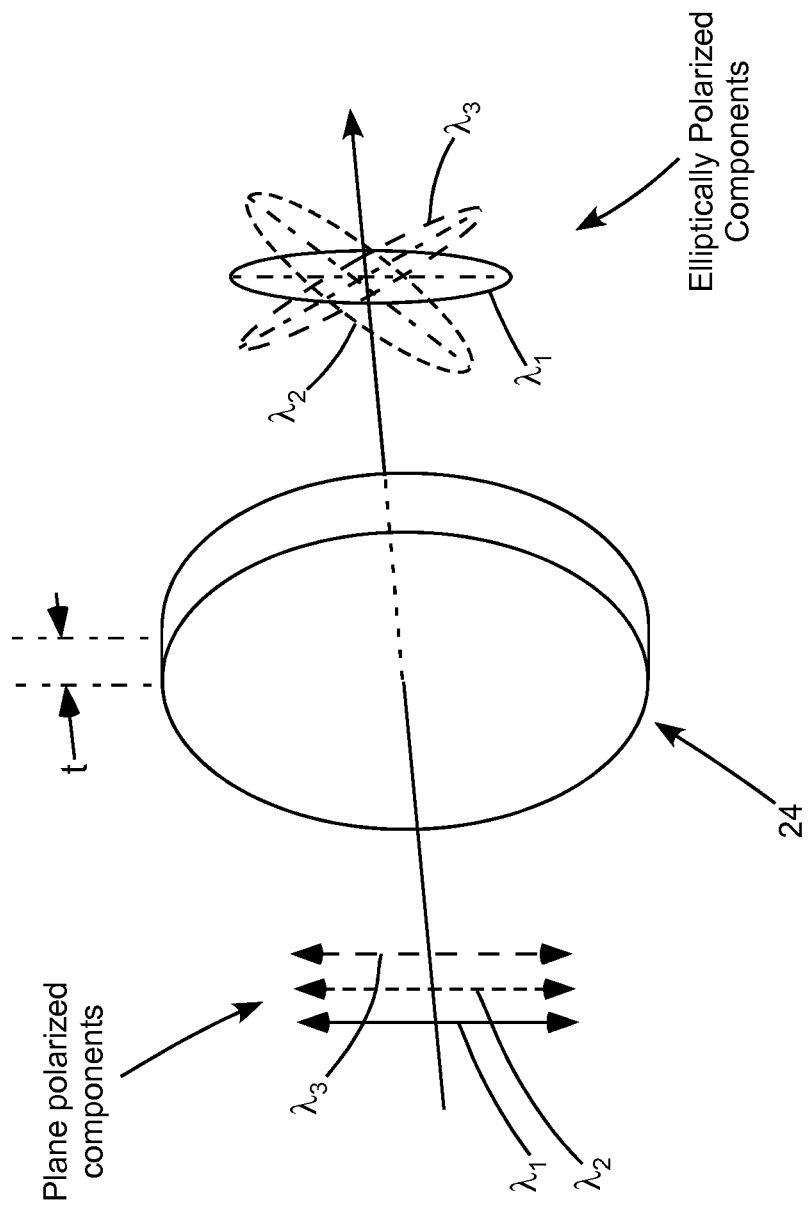
FIG. 3 schematically illustrates the random elliptical polarization action of the birefringent plate of FIG. 1.

This is illustrated schematically in FIG. 3. Here, three plane-polarized wavelength-components $\lambda_1$, $\lambda_2$, and $\lambda_3$ are depicted with polarization-orientations parallel to each other. These wavelength-components are transmitted in the propagation direction of beam 16 (here represented by a single ray), through birefringent plate 24, having a thickness t, preferably equal to or greater than about 0.2 mm. The wavelength components emerge elliptically polarized, with major axes of the elliptically polarization (indicated by long-and-short-dashed lines) at an angle to each other.

One preferred birefringent material for plate 23 is magnesium fluoride ($MgF_2$). A magnesium fluoride plate having a thickness t of 1 mm provides $5\lambda/4$ phase difference (phase-retardation) for radiation having a wavelength of 6 µm and $7\lambda/4$ phase retardation having a wavelength of 5 µm. Radiation having a wavelength in between 5 mm and 6 mm would have some other phase retardation and would be elliptically polarized. By way of example, all wavelength-components identified in the histogram of FIG. 2 would be elliptically polarized.

As noted above, it is possible that a particular plate thickness coupled with a particular wavelength component will produce a circularly polarized beam. Applicants believe that in general, most all of the wavelength components would be elliptically polarized with perhaps only one or two wavelength components being circularly polarized. In addition, it is also possible, although generally unlikely, that one of the wavelength components could be linearly polarized. It is believe that a system which produced only one linearly polarized wavelength component coupled with 14 or more wavelength components that are elliptically polarized can be used successfully in applications which are polarization sensitive.

In, summary the present invention is described above with reference to a preferred and other embodiments. The invention, however, is not limited to the embodiments described and depicted herein. Rather, the invention is limited only by the claims appended hereto.

What is claimed is:

1. Optical apparatus for laser-machining a workpiece, comprising:
    a carbon monoxide laser generating a beam of laser-radiation having a plurality of wavelength-components at discrete different wavelengths;
    a plurality of optical elements arranged to direct the laser-radiation beam from the laser toward the workpiece along a beam-path; and
    a single acousto-optic modulator arranged to selectively transmit the laser-radiation beam along the beam-path to reach and modify the workpiece or diffract the majority of the power of the laser-radiation beam out of the beam-path and with the power of the laser-radiation beam generated by the laser being sufficiently low so that the power of the laser-radiation beam reaching the workpiece that is not diffracted will not modify the work piece.

2. Optical apparatus for laser-machining a workpiece, comprising:
    a carbon monoxide laser delivering a beam of laser-radiation having a plurality of wavelength-components at different wavelengths, the different wavelength components being plane-polarized, with polarization-orientations parallel to each other;
    a plurality of optical elements arranged to direct the laser-radiation beam from the laser toward the workpiece along a beam-path; and
    a birefringent element located in the beam path, the birefringent element having a thickness selected such that most of the wavelength components are elliptically polarized on reaching the workpiece with elliptical polarization axes at an angle to each other, and any that are not elliptically polarized are circularly polarized or linearly polarized with no more than one wavelength component being linearly polarized.

* * * * *